(12) United States Patent
Imafuku

(10) Patent No.: US 11,512,614 B2
(45) Date of Patent: Nov. 29, 2022

(54) TRANSFER FOR FOUR-WHEEL DRIVE VEHICLE

(71) Applicant: TOYOTA JIDOSHA KABUSHIKI KAISHA, Toyota (JP)

(72) Inventor: Mizuki Imafuku, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 592 days.

(21) Appl. No.: 16/656,797

(22) Filed: Oct. 18, 2019

(65) Prior Publication Data

US 2020/0149445 A1 May 14, 2020

(30) Foreign Application Priority Data

Nov. 14, 2018 (JP) .............................. JP2018-214210

(51) Int. Cl.
*F01M 1/16* (2006.01)
*B60K 6/52* (2007.10)
*B60W 10/30* (2006.01)

(52) U.S. Cl.
CPC ................. *F01M 1/16* (2013.01); *B60K 6/52* (2013.01); *B60W 10/30* (2013.01); *B60W 2300/18* (2013.01)

(58) Field of Classification Search
CPC ........ F01M 1/16; B60W 10/30; B60W 23/00; B60K 5/02; B60K 6/52; B60K 17/02; B60K 17/344; B60K 17/348; B60K 17/3515; B60K 23/0808; B60K 25/06; B60Y 2400/4244
See application file for complete search history.

(56) References Cited

U.S. PATENT DOCUMENTS

| 6,386,348 | B1 | 5/2002 | Kunii | |
|---|---|---|---|---|
| 8,428,838 | B2 | 4/2013 | Kondo et al. | |
| 8,469,860 | B1 * | 6/2013 | Kaminsky | B60W 10/02 477/79 |
| 2004/0163916 | A1 | 8/2004 | Showalter | |

(Continued)

FOREIGN PATENT DOCUMENTS

| JP | H11-165550 A | 6/1999 |
|---|---|---|
| JP | 4216975 B2 | 1/2009 |

(Continued)

*Primary Examiner* — Jacob B Meyer
*Assistant Examiner* — Maurice L Williams
(74) *Attorney, Agent, or Firm* — Oliff PLC

(57) ABSTRACT

A transfer for a four-wheel drive vehicle, the four-wheel drive vehicle configured to disconnect a propeller shaft from a power transmission path between an auxiliary drive wheels and a driving power source when the four-wheel drive vehicle travels by two-wheel drive, includes a second output rotating member and an oil pump. The second output rotating member is configured to output a driving power to the propeller shaft. The oil pump is configured to rotationally drive in conjunction with rotation of the second output rotating member via a first one-way clutch. The first one-way clutch is configured such that the oil pump supplies a lubrication oil to a wet clutch when the four-wheel drive vehicle travels forward by the four-wheel drive. The oil pump is configured to stop supplying the lubrication oil to the wet clutch when the four-wheel drive vehicle travels forward by the two-wheel drive.

4 Claims, 8 Drawing Sheets

(56) References Cited

U.S. PATENT DOCUMENTS

| | | | | |
|---|---|---|---|---|
| 2008/0280719 | A1* | 11/2008 | Heindl | B60K 23/0808 475/205 |
| 2009/0095548 | A1* | 4/2009 | Tamba | F04C 14/04 475/5 |
| 2009/0211830 | A1* | 8/2009 | Kato | F16D 28/00 180/244 |
| 2010/0274456 | A1 | 10/2010 | Kondo et al. | |
| 2011/0135498 | A1* | 6/2011 | Gibson | B60W 10/30 417/15 |
| 2011/0197574 | A1* | 8/2011 | Prigent | B60K 17/356 60/413 |
| 2015/0367793 | A1* | 12/2015 | Ishikawa | B60R 17/02 903/917 |
| 2016/0341300 | A1* | 11/2016 | Drill | F16D 13/52 |
| 2016/0363180 | A1* | 12/2016 | Nilsson | F16H 61/30 |
| 2017/0036538 | A1 | 2/2017 | Imafuku | |

FOREIGN PATENT DOCUMENTS

| | | |
|---|---|---|
| JP | 2017-030646 A | 2/2017 |
| KR | 10-2004-0075684 A | 8/2004 |

* cited by examiner

TRANSFER FOR FOUR-WHEEL DRIVE VEHICLE

INCORPORATION BY REFERENCE

The disclosure of Japanese Patent Application No. 2018-214210 filed on Nov. 14, 2018 including the specification, drawings and abstract is incorporated herein by reference in its entirety.

BACKGROUND

1. Technical Field

The present disclosure relates to a transfer of a four-wheel drive vehicle in which part of driving power transmitted from a driving power source to main drive wheels is transmitted to auxiliary drive wheels via a wet clutch.

2. Description of Related Art

There has been known a transfer for a four-wheel drive vehicle that includes: a driving power source; main drive wheels and auxiliary drive wheels; a propeller shaft that transmits part of driving power from the driving power source to auxiliary drive wheels during the four-wheel drive, and the four-wheel drive vehicle is configured to separate the propeller shaft from a power transmission path between the auxiliary drive wheels and the driving power source during the two-wheel drive, wherein the transfer includes: an input rotating member coupled to the driving power source so as to transmit the power from the driving power source, and rotatable about a first rotation axis; a first output rotating member that outputs the driving power transmitted to the input rotating member from the driving power source, to the main drive wheels; a second output rotating member that outputs the driving power to the propeller shaft; a high-low switching mechanism that includes a planetary gear device so as to change rotation of the input rotating member and transmit this rotation to the first output rotating member; a wet clutch that transmits part of the driving power transmitted to the first output rotating member, to the second output rotating member; and an oil pump that supplies a lubrication oil to the wet clutch. For example, a transfer for a four-wheel drive vehicle described in Japanese Unexamined Patent Application Publication No. 2017-30646 (JP 2017-30646 A) may be an example of the above transfer. As shown in FIG. 4 of JP 2017-30646 A, it is shown that the oil pump is brought to rotationally drive by a drive gear provided to a rotating element of the planetary gear device.

SUMMARY

Meanwhile, as seen in FIG. 4 of JP 2017-30646 A, when the oil pump is brought to rotationally drive by the drive gear provide to the rotating element of the planetary gear device, the drive gear rotates and the oil pump rotationally drive during either the two-wheel drive or four-wheel drive of the four-wheel drive vehicle, and thus the lubricating oil is supplied from the oil pump to the wet clutch regardless of at the time of the two-wheel drive or at the time of the four-wheel drive of the four-wheel drive vehicle. Consequently, even when the four-wheel drive vehicle travels forward by the two-wheel drive, in which the wet clutch is released and it is unnecessary to supply the lubricating oil to the wet clutch, the same amount of lubricating oil as that during the four-wheel drive of the four-wheel drive vehicle is supplied to the wet clutch that does not require the supply of the lubricating oil; therefore, when the four-wheel drive vehicle travels forward by the two-wheel drive, there is a problem that the loss of the driving power transmitted from the driving power source to the main driving wheels becomes greater.

The present disclosure has been made based on the above background, and provides a transfer for a four-wheel drive vehicle capable of reducing the loss of driving power transmitted from a driving power source to main driving wheels when the four-wheel drive vehicle travels forward by two-wheel drive.

A transfer for a four-wheel drive vehicle according to one aspect of the present disclosure, includes: an input rotating member; a first output rotating member; a second output rotating member; a single-plate or a multi-plate wet clutch; and an oil pump. The four-wheel drive vehicle includes a driving power source, main drive wheels and auxiliary drive wheels, and a propeller shaft that transmits part of driving power from the driving power source to the auxiliary drive wheels when the four-wheel drive vehicle travels by four-wheel drive, and the four-wheel drive vehicle is configured to disconnect the propeller shaft from a power transmission path between the auxiliary drive wheels and the driving power source when the four-wheel drive vehicle travels by two-wheel drive. The input rotating member is configured to be coupled to the driving power source in a power transmittable manner and to rotate about a first rotation axis. The first output rotating member is configured to output the driving power transmitted to the input rotating member from the driving power source, to the main drive wheels. The second output rotating member is configured to output the driving power to the propeller shaft. The wet clutch is configured to transmit part of the driving power transmitted to the first output rotating member, to the second output rotating member. The oil pump is configured to rotationally drive in conjunction with rotation of the second output rotating member via a first one-way clutch. The first one-way clutch is configured such that the oil pump supplies a lubrication oil to the wet clutch when the four-wheel drive vehicle travels forward by the four-wheel drive. The oil pump is also configured to stop supplying the lubrication oil to the wet clutch when the four-wheel drive vehicle travels forward by the two-wheel drive.

According to the transfer for a four-wheel drive vehicle of one aspect of the present disclosure, the oil pump stops when the four-wheel drive vehicle travels forward by the two-wheel drive, in which the wet clutch is released. Therefore, the oil pump stops when it is unnecessary to supply the lubricating oil to the wet clutch. Since the oil pump stops when the four-wheel drive vehicle travels forward by the two-wheel drive, the loss of the driving power transmitted from the driving power source to the main driving wheels can be preferably reduced.

In the transfer for a four-wheel drive vehicle according to one aspect of the present disclosure, the transfer may further include: a drive gear for pump drive coupled to the input rotating member in a power transmittable manner, and rotating about the first rotation axis; and a second one-way clutch located in a power transmission path between the oil pump and the drive gear for pump drive. The second one-way clutch may be configured to transmit a rotational driving power in a reverse direction from the drive gear for pump drive, to the oil pump when the four-wheel drive vehicle travels backward, and configured not to transmit the rotational driving power from the drive gear for pump drive in a forward direction, to the oil pump when the four-wheel drive vehicle travels forward.

According to the transfer for a four-wheel drive vehicle of one aspect of the present disclosure, the second one-way clutch transmits the rotational driving power in the reverse direction from the drive gear for pump drive to the oil pump when the four-wheel drive vehicle travels backward, and thus the oil pump can be brought to rotationally drive at the time of the backward traveling of the four-wheel drive vehicle. Therefore, even in such a scene that the four-wheel drive vehicle travels backward by the four-wheel drive during traveling on off-road terrains which makes it relatively difficult for the four-wheel drive vehicle to travel by the two-wheel drive, it is possible to preferably suppress seizing of the wet clutch when the four-wheel drive vehicle travels backward on off-road terrains.

According to the transfer for a four-wheel drive vehicle of one aspect of the present disclosure, the transfer may further include: a planetary gear device including a first rotating element coupled to the input rotating member, a second rotating element, and a third rotating element coupled to a non-rotating member; and a high-low switching mechanism configured to switch a rotating element of the first rotating element and the second rotating element, the rotating element being coupled to the first output rotating member. The drive gear for pump drive may be configured to rotate about the first rotation axis together with the second rotating element of the planetary gear device.

According to the transfer for a four-wheel drive vehicle of one aspect of the present disclosure, in the four-wheel drive vehicle provided with the high-low switching mechanism, it is possible to preferably reduce the loss of the driving power transmitted from the driving power source to the main drive wheels at the time of the forward traveling of the four-wheel drive vehicle by the two-wheel drive; and it is also possible to preferably suppress seizing of the wet clutch when the four-wheel drive vehicle travels backward on off-road terrains.

According to the transfer for a four-wheel drive vehicle of one aspect of the present disclosure, the transfer may further include a first driven gear. The oil pump may include an oil pump drive shaft rotating about a second rotation axis in a predetermined direction so as to supply the lubrication oil to the wet clutch. The first driven gear may have an annular shape, and may mesh with the drive gear for pump drive on an outer periphery of the oil pump drive shaft. The second one-way clutch may be located between an outer peripheral surface of the oil pump drive shaft and an inner peripheral surface of the first driven gear. The second one-way clutch may be configured such that the oil pump drive shaft rotates about the second rotation axis in the predetermined direction when the drive gear for pump drive rotates in the reverse direction. The second one-way clutch may be configured not to transmit the rotational driving power in the forward direction from the drive gear for pump drive, to the oil pump drive shaft when the drive gear for pump drive rotates in the forward direction.

According to the transfer for a four-wheel drive vehicle of one aspect of the present disclosure, even when the drive gear for pump drive rotates in the forward direction, the oil pump drive shaft is prevented from reversely rotating in the direction opposite to the predetermined direction in conjunction with the rotation of the drive gear for pump drive.

According to the transfer for a four-wheel drive vehicle of one aspect of the present disclosure, the transfer may further include: an annular transmission member; and a second driven gear coupled to the outer periphery of the oil pump drive shaft via the annular transmission member such that the power is transmitted between the second output rotating member and the second driven gear. The first one-way clutch may be located between the outer peripheral surface of the oil pump drive shaft and an inner peripheral surface of the second driven gear. The first one-way clutch may be configured such that the oil pump drive shaft may rotate about the second rotation axis in the predetermined direction when the second output rotating member rotates in the forward direction. The first one-way clutch may be configured such that the rotational driving power in the reverse direction from the second output rotating member is not transmitted to the oil pump drive shaft when the second output rotating member rotates in the reverse direction.

According to the transfer for a four-wheel drive vehicle of one aspect of the present disclosure, even when the second output rotating member rotates in the reverse direction, the oil pump drive shaft is prevented from reversely rotating in the direction opposite to the predetermined direction in conjunction with the rotation of the second output rotating member.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Hereinafter, embodiments of the present disclosure will be described in detail with reference to the drawings. In the following embodiments, the drawings are appropriately simplified or modified, and dimensional ratios, shapes, etc. of respective components are not always illustrated in an accurate manner.

Figure 1:
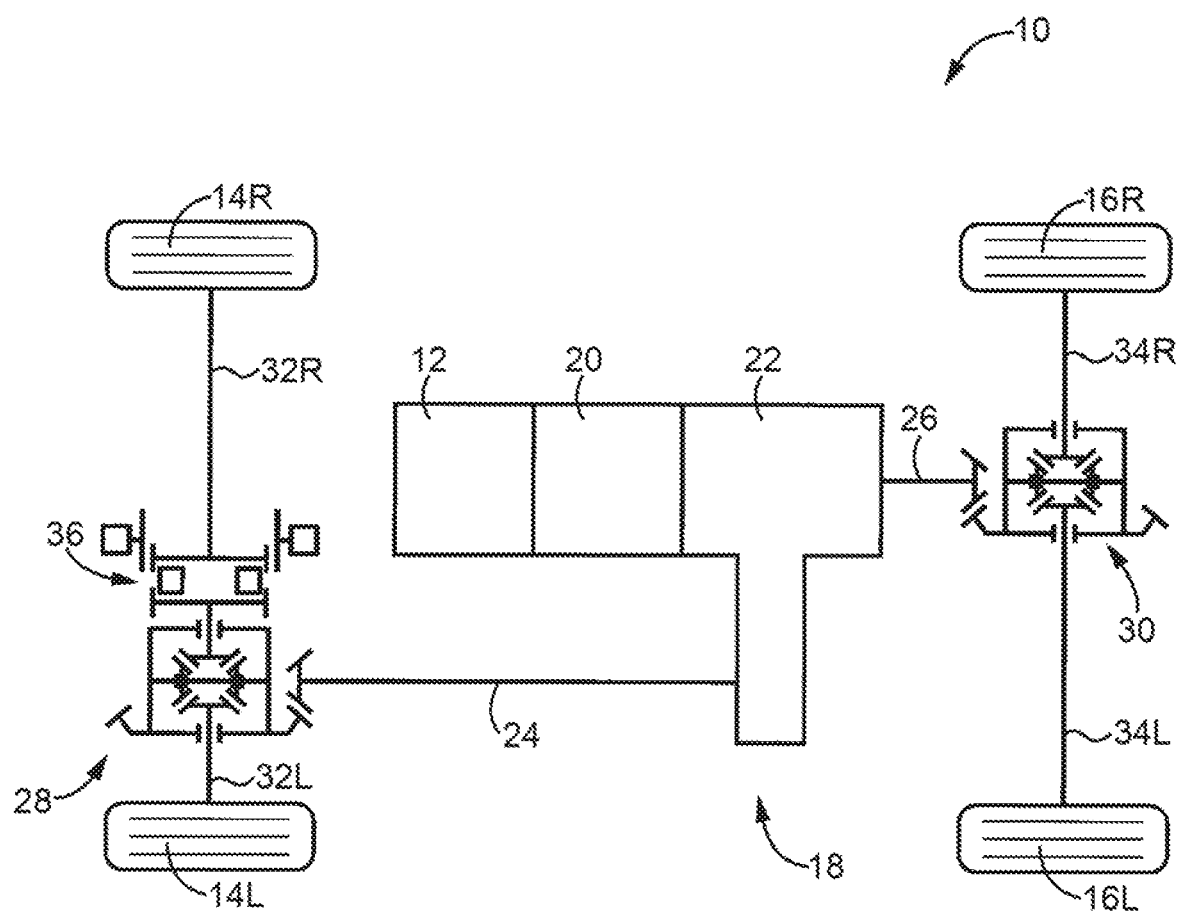
FIG. 1 is a skeleton view schematically explaining a configuration of a four-wheel drive vehicle to which the present disclosure is applied in a preferable manner.

FIG. 1 is a view explaining the schematic configuration of a four-wheel drive vehicle 10 to which the present disclosure is applied. As shown in FIG. 1, the four-wheel drive vehicle 10 includes an engine 12 as a driving power source, a pair of left and right front wheels 14L, 14R, a pair of left and right rear wheels 16L, 16R, a power transmission device 18, and others. The power transmission device 18 transmits driving power (torque) from the engine 12 respectively to the front wheels 14L, 14R and the rear wheels 16L, 16R Note that the rear wheels 16L, 16R are main drive wheels serving as drive wheels when the four-wheel drive vehicle 10 travels by two-wheel drive, that is, at the time of two-wheel drive of the four-wheel drive vehicle 10, and when the four-wheel drive vehicle 10 travels by four-wheel drive, that is, at the time of four-wheel drive of the four-wheel drive vehicle 10. The front wheels 14L, 14R are auxiliary drive wheels that serve as driven wheels at the time of two-wheel drive of the four-wheel drive vehicle 10, and serve as driving wheels at the time of four-wheel drive of the four-wheel drive vehicle 10. The four-wheel drive vehicle 10 is a four-wheel drive vehicle on a front-engine rear-wheel drive (FR) basis.

As shown in FIG. 1, the power transmission device 18 includes: an automatic transmission 20; a transfer (transfer for a four-wheel drive vehicle) 22; a front propeller shaft (propeller shaft) 24 and a rear propeller shaft 26; a front-wheel differential gear unit 28; a rear-wheel differential gear unit 30; a pair of left and right front wheel axles 32L, 32R; and a pair of left and right rear wheel axles 34L, 34R. The automatic transmission 20 is configured, for example, such that a plurality of hydraulic frictional engagement devices are selectively operated so as to establish a plurality of forward gear stages and a single reverse gear stage, and the automatic transmission 20 is coupled to the engine 12 in a power transmittable manner. The transfer 22 is coupled to the automatic transmission 20 in a power transmittable manner, and the transfer 22 functions as a front-rear wheel driving power distribution device that distributes the driving power output from the engine 12 to the front wheels 14L, 14R and the rear wheels 16L, 16R. The front propeller shaft 24 and the rear propeller shaft 26 are respectively coupled to the transfer 22 in a power transmittable manner. The front-wheel differential gear unit 28 is coupled to the front propeller shaft 24 in a power transmittable manner. The rear-wheel differential gear unit 30 is coupled to the rear propeller shaft 26 in a power transmittable manner. The pair of left and right front wheel axles 32L, 32R are respectively coupled to the front-wheel differential gear unit 28 in a power transmittable manner. The pair of left and right rear wheel axles 34L, 34R are respectively coupled to the rear-wheel differential gear unit 30 in a power transmittable manner. In the power transmission device 18 as configured above, the driving power from the engine 12, which has been transmitted to the transfer 22 via the automatic transmission 20, is sequentially transmitted, for example, via the rear propeller shaft 26, the rear-wheel differential gear unit 30, and the rear wheel axles 34L, 34R, etc., to the rear wheels 16L, 16R. In addition, when part of the driving power from the engine 12 is distributed to the front wheel 14 side in the transfer 22, the distributed driving power is sequentially transmitted, for example, via the front propeller shaft 24, the front-wheel differential gear unit 28, the front wheel axles 32L, 32R, etc., to the front wheels 14L, 14R. The power transmission device 18 includes a front-wheel side meshing clutch 36 configured to selectively connect or disconnect a power transmission path between the front-wheel differential gear unit 28 and the front wheel axle 32R.

Figure 2:
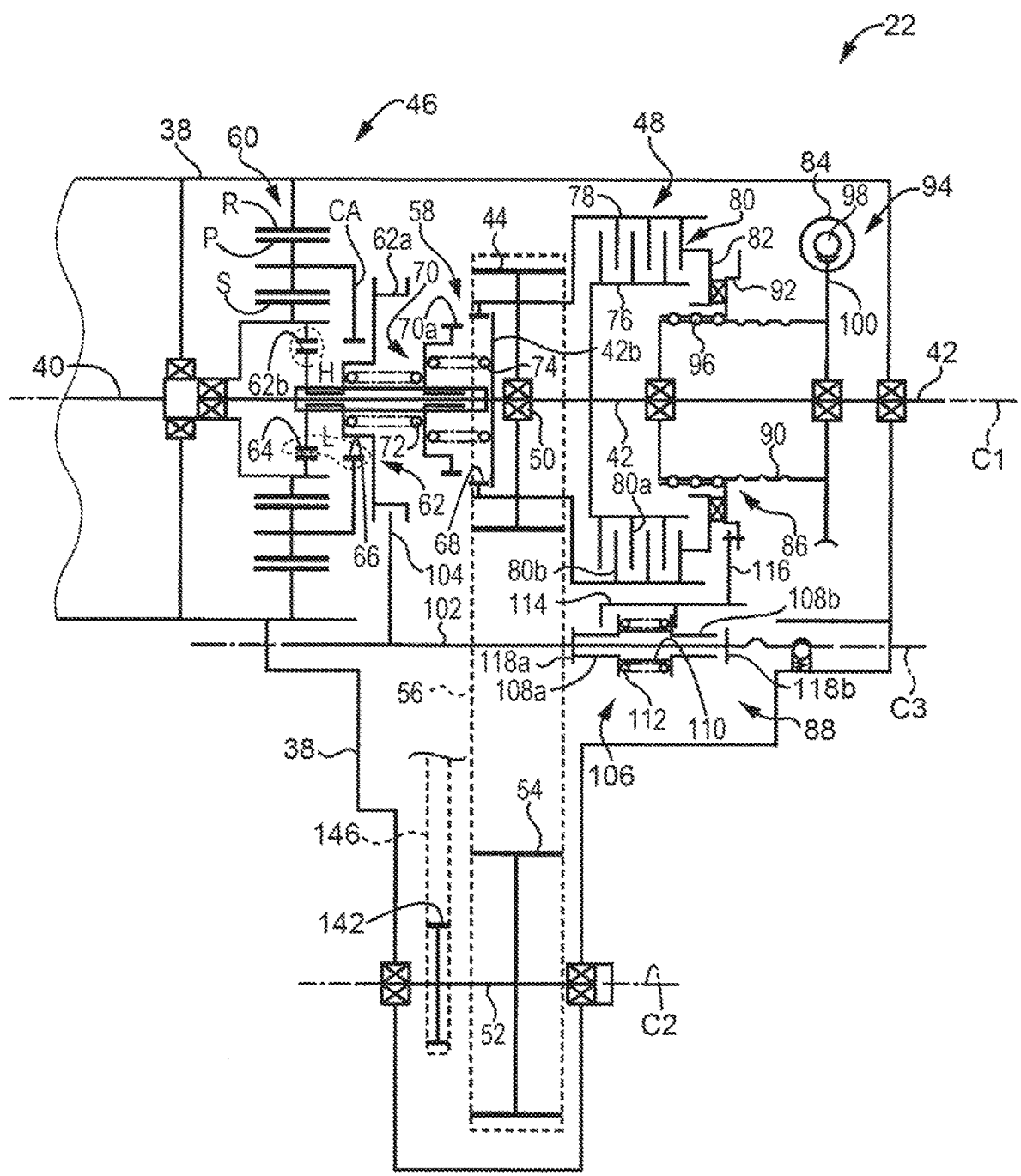
FIG. 2 is a skeleton view explaining the configuration of a transfer provided in the four-wheel drive vehicle of FIG. 1.
Figure 3:
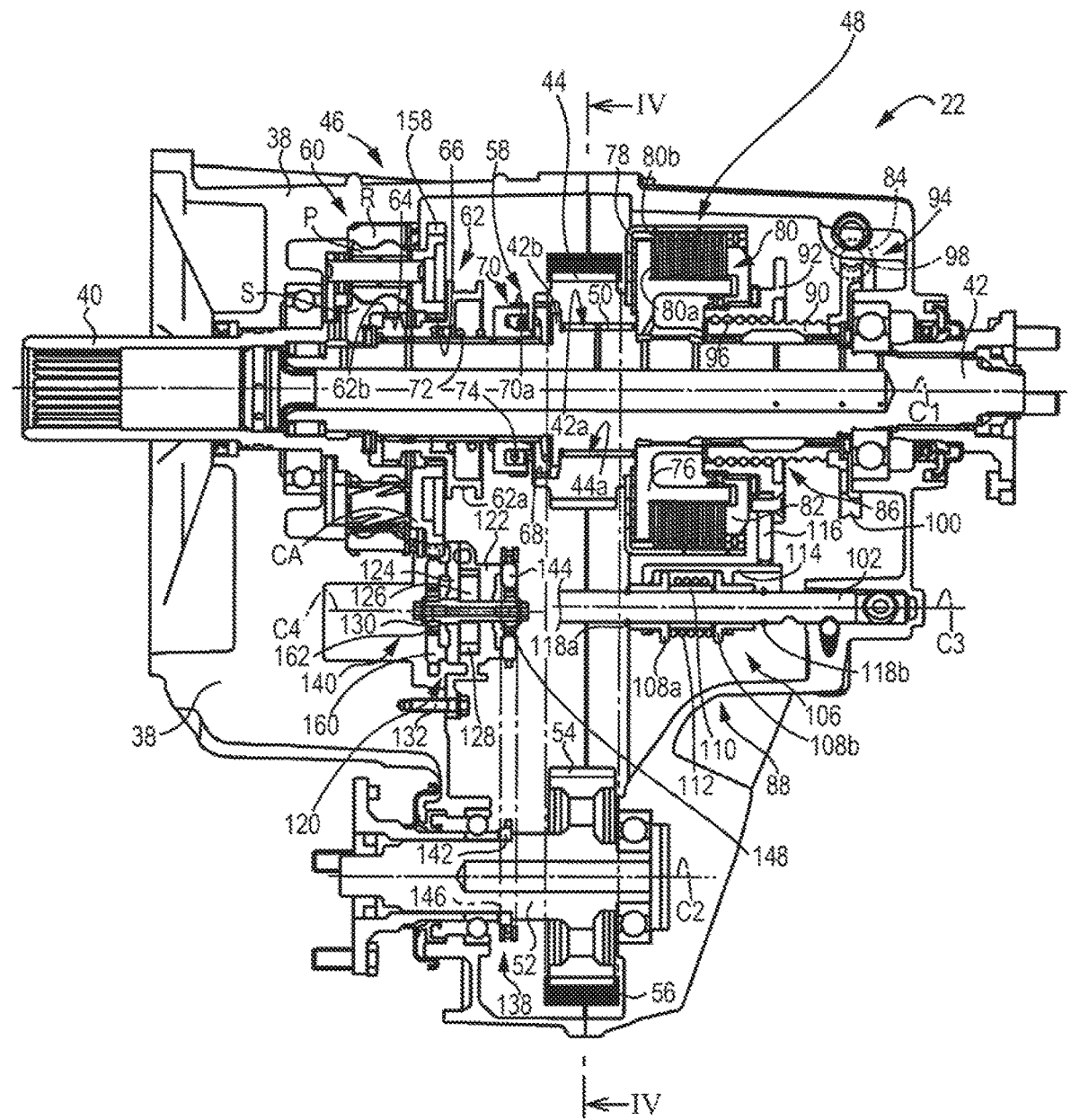
FIG. 3 is a sectional view for explaining the configuration of the transfer provided in the four-wheel drive vehicle of FIG. 1.
Figure 4:
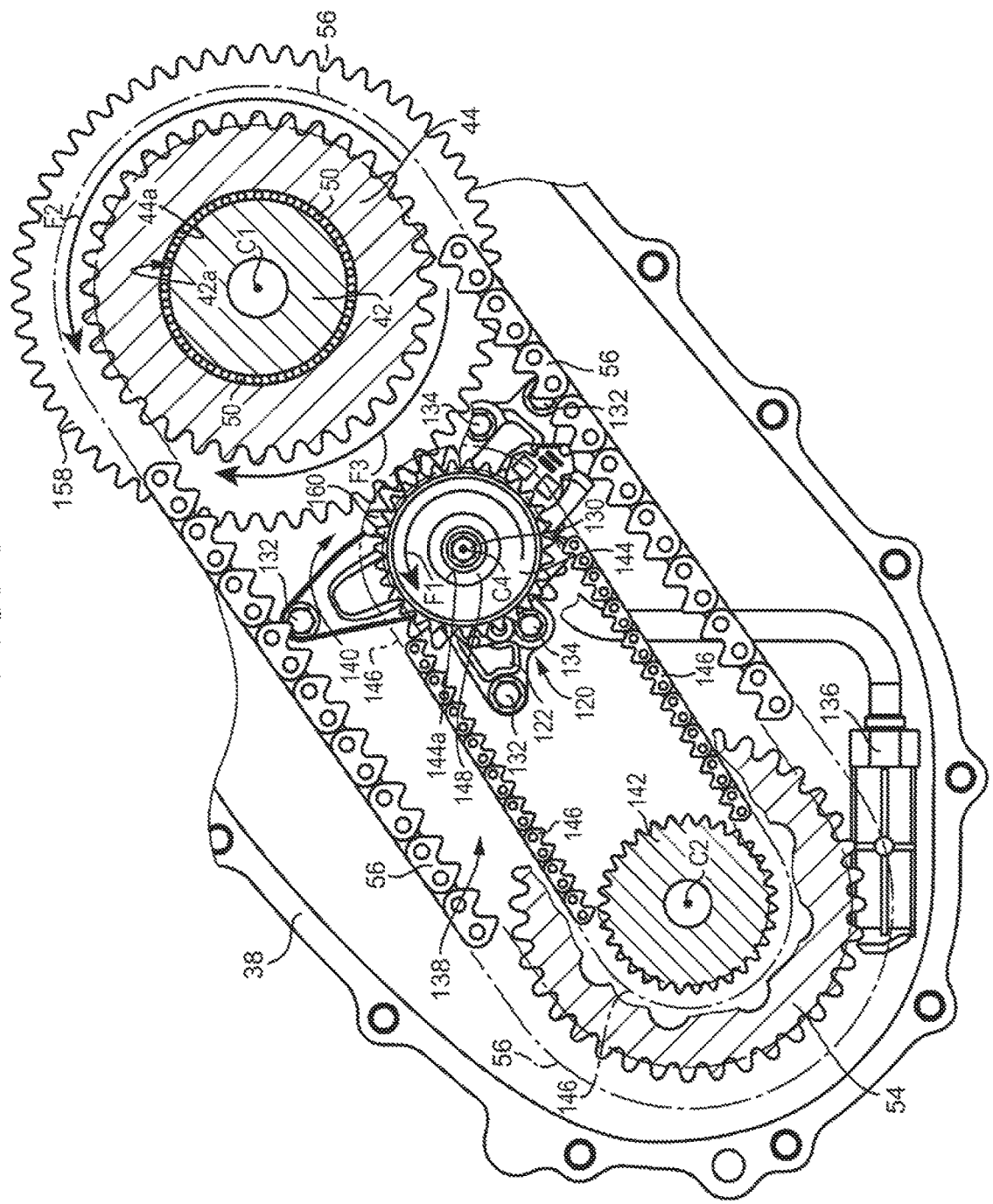
FIG. 4 is a sectional view taken along line IV-IV in FIG. 3.

FIG. 2 is a skeleton view explaining a schematic configuration of the transfer 22. As shown in FIG. 2, the transfer 22 includes a transfer case 38 as a non-rotating member. In the transfer case 38, the transfer 22 includes an input shaft (input rotating member) 40, a rear wheel-side output shaft (first output rotating member) 42, a drive sprocket for front wheel drive (second output rotating member) 44, a high-low switching mechanism 46, and a front-wheel drive clutch (wet clutch) 48. These components included in the transfer 22 are arranged about a common first rotation axis C1. The input shaft 40 is coupled to the engine 12 via the automatic transmission 20 in a power transmittable manner, and the input shaft 40 is rotatably supported by the transfer case 38 about the first rotation axis C1. The rear wheel-side output shaft 42 is coupled to the rear propeller shaft 26 in a power transmittable manner, and the rear wheel-side output shaft 42 outputs the driving power transmitted from the engine 12 to the input shaft 40, to the rear wheels 16L, 16R. The drive sprocket for front wheel drive 44 is supported by the rear wheel-side output shaft 42 so as to be rotatable relative to the rear wheel-side output shaft 42. When part of the driving power is transmitted from the engine 12 to the drive sprocket for front wheel drive 44 by a front-wheel drive clutch 48, for example, the drive sprocket for front wheel drive 44 outputs the part of the driving power transmitted from the engine 12 to the front propeller shaft 24. As shown in FIG. 3 and FIG. 4, a needle bearing 50 is disposed between an inner peripheral surface 44a of the drive sprocket for front wheel drive 44 and an outer peripheral surface 42a of the rear wheel-side output shaft 42. The high-low switching mechanism 46 functions as an auxiliary transmission that changes rotation of the input shaft 40 and transmits this rotation to the rear wheel-side output shaft 42. The front-wheel drive clutch 48 is a multi-plate wet clutch, and the front-wheel drive clutch 48 transmits part of the driving power transmitted to the rear wheel-side output shaft 42, to the drive sprocket for front wheel drive 44, that is, adjusts a transmitted torque transmitted from the rear wheel-side output shaft 42 to the drive sprocket for front wheel drive 44.

Further, in the transfer case 38, the transfer 22 includes a front wheel-side output shaft 52 and a driven sprocket for front wheel drive 54. The front wheel-side output shaft 52 and the driven sprocket for front wheel drive 54 have a common second rotation axis C2. The transfer 22 further includes a front-wheel drive chain 56 and a differential lock mechanism 58. The front wheel-side output shaft 52 is coupled to the front propeller shaft 24 in a power transmittable manner. The driven sprocket for front wheel drive 54 is integrally provided to the front wheel-side output shaft 52. The front-wheel drive chain 56 is hung respectively on the drive sprocket for front wheel drive 44 and the driven sprocket for front wheel drive 54 so as to couple the drive sprocket for front wheel drive 44 and the driven sprocket for front wheel drive 54 to each other in a power transmittable manner. The differential lock mechanism 58 is a dog clutch that selectively couples the rear wheel-side output shaft 42 and the drive sprocket for front wheel drive 44, and the differential lock mechanism 58 selectively switches between a differential state in which differential rotation between the rear propeller shaft 26 and the front propeller shaft 24 is not limited, and a non-differential state in which the differential rotation therebetween is limited.

As shown in FIG. 2 and FIG. 3, the high-low switching mechanism 46 includes a single pinion-type planetary gear device 60 and a high-low sleeve 62. The planetary gear device 60 includes: a sun gear (a first rotating element) S coupled to the input shaft 40 in a power transmittable manner; a ring gear (a third rotating element) R coupled to the transfer case 38 so as to be non-rotatable about the first rotation axis C1; and a carrier (a second rotating element) CA rotatably supporting a plurality of pinion gears P meshing with the sun gear S and the ring gear R in such a manner as to allow rotations of these pinion gears about their own axes as well as orbital revolutions of these pinion gears about the first rotation axis C1. Therefore, in the high-low switching mechanism 46, the rotational speed of the sun gear S is constant relative to the input shaft 40, and the rotational speed of the carrier CA is decelerated relative to the input shaft 40. As shown in FIG. 2, high-side gear teeth 64 are formed on an inner peripheral surface of the sun gear S, and the carrier CA is formed with low-side gear teeth 66 having the same diameter as that of the high-side gear teeth 64.

The high-low sleeve 62 is spline-fitted to the rear wheel-side output shaft 42 so as to be movable relative to the rear wheel-side output shaft 42 in the direction of the first rotation axis C1 and non-rotatable relative to the rear wheel-side output shaft 42. The high-low sleeve 62 includes a fork coupling portion 62a, and outer peripheral teeth 62b integrally provided adjacent to the fork coupling portion 62a. In the high-low switching mechanism 46, when the high-low sleeve 62 is moved in the direction of the first rotation axis C1 relative to the rear wheel-side output shaft 42 and the outer peripheral teeth 62b of the high-low sleeve 62 mesh with the high-side gear teeth 64, that is, when the sun gear S is coupled to the rear wheel-side output shaft 42, a high-speed gear stage H for transmitting rotation having an equal speed to that of the rotation of the input shaft 40 to the rear wheel-side output shaft 42 is established. Further, in the high-low switching mechanism 46, when the high-low sleeve 62 is moved in the direction of the first rotation axis C1 relative to the rear wheel-side output shaft 42 and the outer peripheral teeth 62b of the high-low sleeve 62 mesh with the low-side gear teeth 66, that is, when the carrier CA is coupled to the rear wheel-side output shaft 42, a low-speed gear stage L for transmitting rotation decelerated relative to the rotation of the input shaft 40 to the rear wheel-side output shaft 42 is established.

As shown in FIG. 2 and FIG. 3, the differential lock mechanism 58 includes: lock teeth 68 formed on the inner peripheral surface 44a of the drive sprocket for front wheel drive 44; and a lock sleeve 70 spline-fitted to the rear wheel-side output shaft 42 in such a manner as to be movable in the direction of the first rotation axis C1 relative to the rear wheel-side output shaft 42 and non-rotatable relative to the rear wheel-side output shaft 42. The lock sleeve 70 is formed with outer peripheral teeth 70a capable of meshing with the lock teeth 68. In the differential lock mechanism 58, when the lock sleeve 70 is moved in the direction of the first rotation axis C1 relative to the rear wheel-side output shaft 42 and the outer peripheral teeth 70a of the lock sleeve 70 mesh with the lock teeth 68, the rear wheel-side output shaft 42 and the drive sprocket for front wheel drive 44 integrally rotate with each other.

As shown in FIG. 2 and FIG. 3, the transfer 22 includes a coiled first spring 72 and a coiled second spring 74. The first spring 72 is disposed in a compressed state between the high-low sleeve 62 and the lock sleeve 70 so as to urge the high-low sleeve 62 and the lock sleeve 70 in a direction where these sleeves are apart from each other. The second spring 74 is disposed in a compressed state between a projecting portion 42b formed on the rear wheel-side output shaft 42 and the lock sleeve 70 so as to urge the lock sleeve 70 in a direction where the lock sleeve 70 is apart from the lock teeth 68. In the transfer 22, when the outer peripheral teeth 62b of the high-low sleeve 62 mesh with the low-side gear teeth 66, the lock sleeve 70 moves in a direction closer to the lock teeth 68 by the urging force of the first spring 72 while resisting the urging force of the second spring 74, and the outer peripheral teeth 70a of the lock sleeve 70 thus mesh with the lock teeth 68. Further, in the transfer 22, when the outer peripheral teeth 62b of the high-low sleeve 62 mesh with the high-side gear teeth 64, the lock sleeve 70 moves in a direction apart from the lock teeth 68 by the urging force of the second spring 74 while resisting the urging force of the first spring 72, and the outer peripheral teeth 70a of the lock sleeve 70 thus moves apart from the lock teeth 68.

As shown in FIG. 2 and FIG. 3, the front-wheel drive clutch 48 includes a clutch hub 76, a clutch drum 78, a frictional engagement element 80, and a piston 82. The clutch hub 76 is coupled to the rear wheel-side output shaft 42 in a power transmittable manner. The clutch drum 78 is coupled to the drive sprocket for front wheel drive 44 in a power transmittable manner. The frictional engagement element 80 includes: a plurality of first friction plates 80a configured to be movable in the direction of the first rotation axis C1 relative to the clutch hub 76 and to be provided in a power transmittable manner relative to the clutch hub 76; and a plurality of second friction plates 80b configured to be movable in the direction of the first rotation axis C1 relative to the clutch drum 78 and to be provided in a power transmittable manner relative to the clutch drum 78. The piston 82 abuts to the frictional engagement element 80 so as to press the first friction plate 80a and the second friction plate 80b to each other. When the piston 82 is moved toward a non-pressing side that is the side away from the drive sprocket for front wheel drive 44 in the direction of the first rotation axis C1, and the piston 82 comes out of contact with the frictional engagement element 80; the front-wheel drive clutch 48 comes into a released state. On the other hand, when the piston 82 is moved toward a pressing side that is the side closer to the drive sprocket for front wheel drive 44 in the direction of the first rotation axis C1, and the piston 82 comes into contact with the frictional engagement element 80; and in this state, the transmitted torque between the clutch hub 76 and the clutch drum 78 is adjusted in accordance with the amount of movement of the piston 82; therefore, the front-wheel drive clutch 48 selectively comes into one of a released state, a slipped state, and a completely engaged state.

In the transfer 22, when the front-wheel drive clutch 48 is in the released state and the outer peripheral teeth 70a of the lock sleeve 70 and the lock teeth 68 are out of mesh with each other in the released state in the differential lock mechanism 58, the power transmission path between the rear wheel-side output shaft 42 and the drive sprocket for front wheel drive 44 is disconnected. Hence, the driving power transmitted from the engine 12 through the automatic transmission 20 is transmitted only to the rear wheels 16L, 16R, that is, to the rear propeller shaft 26. In addition, in the transfer 22, when the front-wheel drive clutch 48 is in the slipped state or in the completely engaged state, the power transmission path between the rear wheel-side output shaft 42 and the drive sprocket for front wheel drive 44 is connected. Therefore, the driving power transmitted from engine 12 through the automatic transmission 20 is distributed respectively to the front wheels 14L, 14R and the rear wheels 16L, 16R, that is, respectively to the front propeller shaft 24 and the rear propeller shaft 26.

As devices for operating the high-low switching mechanism 46, the front-wheel drive clutch 48, and the differential lock mechanism 58, as shown in FIG. 2, the transfer 22 includes: an electric motor 84; a screw mechanism 86 that converts a rotational motion of the electric motor 84 into a linear motion; and a transmission mechanism 88 that transmits the linear motion converted by the screw mechanism 86 to the high-low switching mechanism 46, the front-wheel drive clutch 48, and the differential lock mechanism 58, respectively.

The screw mechanism 86 is disposed on the first rotation axis C1 having the same axial center as that of the rear wheel-side output shaft 42, and includes a screw shaft member 90 and a nut member 92. The screw shaft member 90 is indirectly connected to the electric motor 84 via a worm gear 94. The nut member 92 is screwed with the screw shaft member 90 so as to be movable in the direction of the first rotation axis C1 relative to the screw shaft member 90 as the screw shaft member 90 rotates about the first rotation axis C1. The screw mechanism 86 is a ball screw configured by the screw shaft member 90 and the nut member 92 that operate via a plurality of ball screws 96. The worm gear 94 is a gear pair including a worm 98 integrally formed with a motor shaft of the electric motor 84 and a worm wheel 100 integrally formed with the screw shaft member 90. With this configuration, the screw mechanism 86 converts rotation from the electric motor 84 transmitted through the worm gear 94 to the screw shaft member 90 into a linear motion of the nut member 92 in the direction of the first rotation axis C1.

The transmission mechanism 88 includes a fork shaft 102 and a fork 104, as shown in FIG. 2. The fork shaft 102 is disposed on a third rotation axis C3 parallel to the first rotation axis C1, and the fork shaft 102 is coupled to the nut member 92 in a power transmittable manner. The fork 104 is fixed to the fork shaft 102, and the fork 104 is coupled to the fork coupling portion 62a of the high-low sleeve 62. Therefore, the transmission mechanism 88 transmits a force of the linear motion of the nut member 92 in the screw mechanism 86 to the high-low sleeve 62 of the high-low switching mechanism 46 via the fork shaft 102 and the fork 104. As aforementioned, the first spring 72 is provided between the high-low sleeve 62 and the lock sleeve 70, and the second spring 74 is provided between the lock sleeve 70 and the projecting portion 42b of the rear wheel-side output shaft 42. Thus, in the screw mechanism 86, the transmission mechanism 88 transmits the force of the linear motion of the nut member 92 to the high-low sleeve 62, and also transmits this force to the lock sleeve 70 of the differential lock mechanism 58 by the first spring 72 and the second spring 74.

As shown in FIG. 2, the piston 82 of the front-wheel drive clutch 48 is coupled to the nut member 92 of the screw mechanism 86 so as to be rotatable about the first rotation axis C1 relative to the nut member 92, and also so as not to be movable in the direction of the first rotation axis C1 relative to the nut member 92. Accordingly, in the screw mechanism 86, the force of the linear motion of the nut member 92 is transmitted to the frictional engagement element 80 of the front-wheel drive clutch 48 via the piston 82. Note that the piston 82 is configured as an abutting member that is coupled to the nut member 92 and abuts to the frictional engagement element 80 of the front-wheel drive clutch 48, and also functions as a part of the transmission mechanism 88.

The transmission mechanism 88 includes a coupling mechanism 106 that couples the nut member 92 to the fork shaft 102. The coupling mechanism 106 includes two flanged cylindrical members 108a, 108b, a cylindrical spacer 110, a coiled third spring 112, a gripping member 114, and a coupling member 116. The two flanged cylindrical members 108a, 108b are respectively disposed on the third rotation axis C3 so as to be slidable relative to the fork shaft 102, and the two flanged cylindrical members 108a, 108b are arranged such that respective flanges provided at one ends of the flanged cylindrical members 108a, 108b face each other. The spacer 110 is interposed between the two flanged cylindrical members 108a, 108b. The third spring 112 is disposed on the outer peripheral side of the spacer 110. The gripping member 114 slidably grips the flanges of the two flanged cylindrical members 108a, 108b in the direction of the third rotation axis C3. The coupling member 116 couples the gripping member 114 to the nut member 92. Note that a length between the respective flanges of the flanged cylindrical members 108a, 108b with both the flanges in contact with the gripping member 114 is set longer than a length of the spacer 110. Further, the flanges of the flanged cylindrical members 108a, 108b are both urged to abut to the gripping member 114 by an urging force of the third spring 112 compressed by the respective flanges of the cylindrical members 108a, 108b. Moreover, the fork shaft 102 is provided with stoppers 118a, 118b that disable the flanged cylindrical members 108a, 108b from sliding in the direction of the third rotation axis C3 relative to the fork shaft 102. As the stoppers 118a, 118b disable the sliding of the flanged cylindrical members 108a, 108b in the direction of the third rotation axis C3 relative to the fork shaft 102, in the transmission mechanism 88, it is possible to transmit the force of the linear motion of the nut member 92 to the high-low switching mechanism 46 via the coupling mechanism 106, the fork shaft 102, and the fork 104.

The outer peripheral teeth 70a of the lock sleeve 70 comes into mesh with the lock teeth 68 as the fork shaft 102 is moved to a position where the outer peripheral teeth 62b of the high-low sleeve 62 come into mesh with the low-side gear teeth 66, that is, to the low gear position. In addition, the frictional engagement element 80 of the front-wheel drive clutch 48 is pressed by the piston 82 as the fork shaft 102 is moved to a position where the outer peripheral teeth 62b of the high-low sleeve 62 comes into mesh with the high-side gear teeth 64, that is, to the high gear position; and the frictional engagement element 80 is not pressed by the piston 82 as the fork shaft 102 is moved to the low gear position. When the fork shaft 102 is disposed at the high gear position, in the coupling mechanism 106, the length between the respective flanges of the flanged cylindrical members 108a, 108b can be changed between a length thereof in a state where both the flanges abut to the gripping member 114 and a length of the spacer 110. With this configuration, the coupling mechanism 106 allows the movement of the nut member 92 in the direction of the first rotation axis C1 between the position where the frictional engagement element 80 of the front-wheel drive clutch 48 is pressed by the piston 82 and the position where the frictional engagement element 80 is not pressed by the piston 82 while the fork shaft 102 is disposed at the high gear position.

In the four-wheel drive vehicle 10 as configured above, the amount of rotation of the motor shaft of the electric motor 84 is controlled by drive current supplied from an electronic control device (not shown) to the electric motor 84, to thereby selectively switch the two-wheel drive traveling and the four-wheel drive traveling of the four-wheel drive vehicle 10. For example, by controlling the amount of rotation of the motor shaft, the moving position of the nut member 92, which is moved by the rotation of the motor shaft, is shifted to an H2 position where the piston 82 comes apart from the frictional engagement element 80 of the front-wheel drive clutch 48, and the outer peripheral teeth 62b of the high-low sleeve 62 comes into mesh with the high-side gear teeth 64. Therefore, the four-wheel drive vehicle 10 performs an H2 traveling, that is, the two-wheel drive traveling in which the high-speed gear stage H is established by the high-low switching mechanism 46 and the driving power of the engine 12 is transmitted only to the rear wheels 16L, 16R. Note that when the four-wheel drive vehicle 10 travels by the above two-wheel drive, the front-wheel side meshing clutch 36 is released; thus, the front propeller shaft 24 is disconnected from the power transmission path between the front wheels 14L, 14R and the engine 12. Moreover, by controlling the amount of rotation of the motor shaft, the moving position of the nut member 92, which is moved by the rotation of the motor shaft, is shifted to an H4 position where the piston 82 presses the frictional engagement element 80 of the front-wheel drive clutch 48, and the outer peripheral teeth 62b of the high-low sleeve 62 comes into mesh with the high-side gear teeth 64. Therefore, the four-wheel drive vehicle 10 performs an H4 traveling, that is, the four-wheel drive traveling, in which the high-speed gear stage H is established by the high-low switching mechanism 46, and the driving power of the engine 12 is transmitted to the rear wheels 16L, 16R, and part of the driving power of the engine 12 is also transmitted to the front wheels 14L, 14R. Furthermore, by controlling the amount of rotation of the motor shaft, the movement position of the nut member 92, which is moved by the rotation of the motor shaft, is shifted to a position L4L where the outer peripheral teeth 62b of the high-low sleeve 62 comes into mesh with the low-side gear teeth 66. Therefore, the four-wheel drive vehicle 10 performs an L4L traveling, that is, the four-wheel drive traveling in which the low-speed gear stage L is established by the high-low switching mechanism 46, and the driving power of the engine 12 is transmitted to the rear wheels 16L, 16R, and part of the driving power of the engine 12 is also transmitted to the front wheels 14L, 14R. As described above, when the outer peripheral teeth 62b of the high-low sleeve 62 mesh with the low-side gear teeth 66, the outer peripheral teeth 70a of the lock sleeve 70 come into mesh with the lock teeth 68 by the urging force of the first spring 72 and the urging force of the second spring 74.

Figure 5:
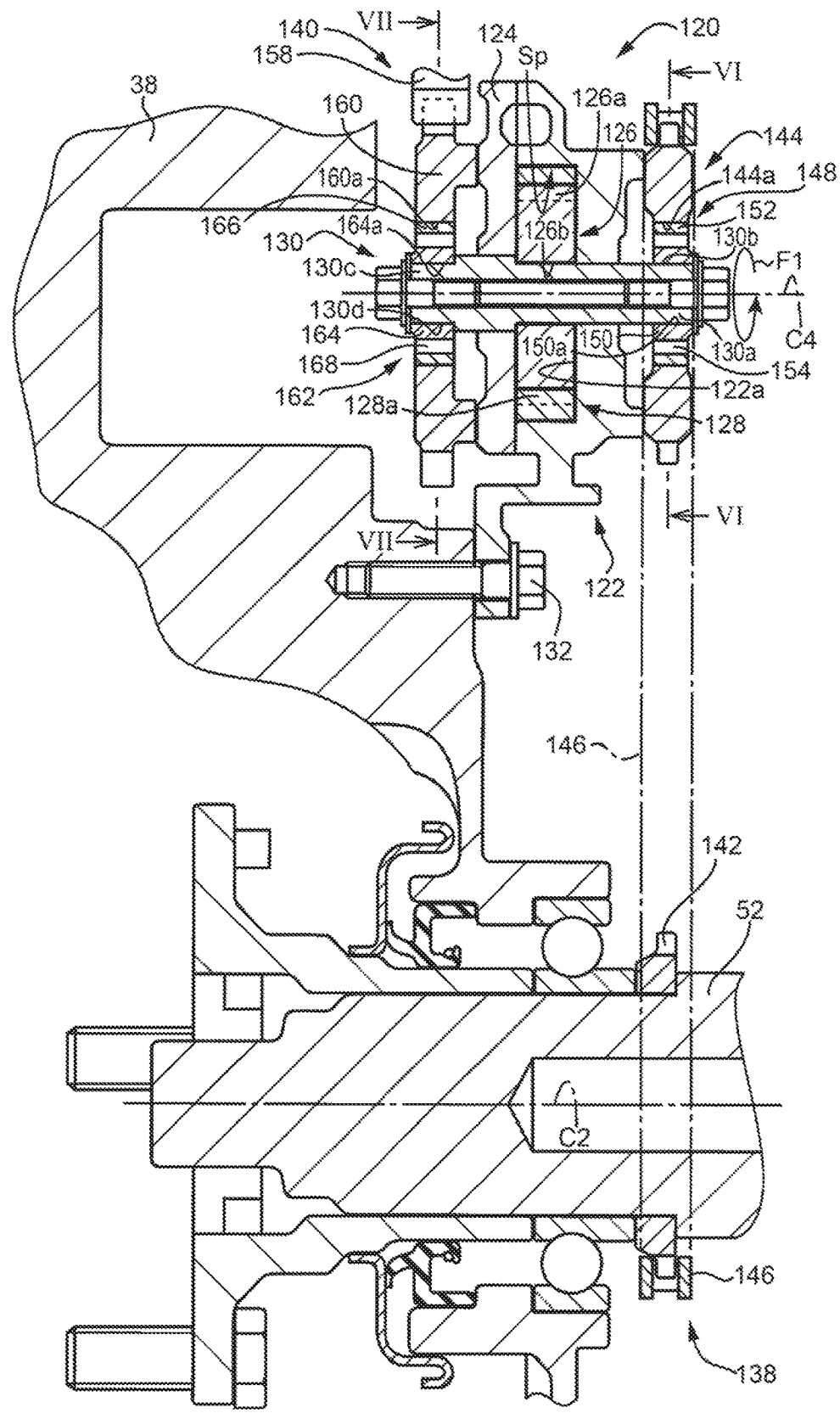
FIG. 5 is an enlarged view of a vicinity of an oil pump of FIG. 3.

In addition, as shown in FIG. 3 to FIG. 5, the transfer 22 includes an oil pump 120 that supplies a lubricating oil (oil) to the front-wheel drive clutch 48, the high-low switching mechanism 46, and the like, for example. The oil pump 120 includes a first pump cover 122, a second pump cover 124, a pump chamber Sp (see FIG. 5), an annular inner rotor 126, an annular outer rotor 128, and an oil pump drive shaft 130. The first pump cover 122 is fixed to the transfer case 38 with a first fastening bolt 132. The second pump cover 124 is fixed to the first pump cover 122 with a second fastening bolt 134 (see FIG. 4). The pump chamber Sp is a space formed by a recessed portion 122a formed in the first pump cover 122 and the second pump cover 124. The inner rotor 126 has a plurality of outer peripheral teeth 126a (see FIG. 5), and the inner rotor 126 is supported by the oil pump drive shaft 130 so as to be rotatable about an axis of the oil pump drive shaft 130, that is, a fourth rotation axis (second rotation axis) C4 in the pump chamber Sp. The fourth rotation axis C4 is parallel to the first rotation axis C1. The outer rotor 128 has a plurality of inner peripheral teeth 128a (see FIG. 5) that mesh with the outer peripheral teeth 126a of the inner rotor 126, and the outer rotor 128 is supported by the recessed portion 122a formed in the first pump cover 122 so as to be rotatable about a rotation axis eccentric to the fourth rotation axis C4 in the pump chamber Sp. The oil pump drive shaft 130 is fitted into a fitting hole 126b formed in the inner rotor 126 so as not to be rotatable relative to the inner rotor 126.

In the oil pump 120 as configured above, when the oil pump drive shaft 130 is rotated about the fourth rotation axis C4 in a predetermined direction, that is, in a direction indicated by an arrow F1 (see FIG. 4 and FIG. 5), the lubricating oil stored in the transfer case 38 is taken into any space or spaces of multiple spaces partitioned by the inner peripheral teeth 128a of the outer rotor 128 and the outer peripheral teeth 126a of the inner rotor 126 in the pump chamber Sp via strainer 136. (See FIG. 4). Then, the lubricating oil taken into the above spaces is compressed as the inner rotor 126 rotates, and this lubricating oil is supplied to the front-wheel drive clutch 48, the high-low switching mechanism 46, and others. That is, the oil pump drive shaft 130 provided in the oil pump 120 is rotated about the fourth rotation axis C4 in the direction of the arrow F1 in order to supply the lubricating oil to the front-wheel drive clutch 48, the high-low switching mechanism 46, and others.

Further, as shown in FIG. 3 to FIG. 5, the transfer 22 includes a first power transmission path 138 and a second power transmission path 140. The first power transmission path 138 transmits a rotational driving power of the drive sprocket for front wheel drive 44, that is, a rotational driving power of the front wheel-side output shaft 52 coupled to the drive sprocket for front wheel drive 44 in a power transmittable manner, to the oil pump drive shaft 130. The second power transmission path 140 transmits a rotational driving power of the input shaft 40 to the oil pump drive shaft 130.

As shown in FIG. 4 and FIG. 5, the first power transmission path 138 includes: a drive sprocket for pump drive 142; a driven sprocket for pump drive (second driven gear) 144; a pump driving chain (annular transmission member) 146; and a first one-way clutch 148. The drive sprocket for pump drive 142 is integrally fixed to the front wheel-side output shaft 52. The driven sprocket for pump drive 144 is formed in an annular shape, and the driven sprocket for pump drive 144 is disposed on an outer periphery of an end 130a (see FIG. 5) on the rear wheel 16L, 16R side of the oil pump drive shaft 130. The pump driving chain 146 is hooked on the drive sprocket for pump drive 142 and the driven sprocket for pump drive 144 respectively, and couples the drive sprocket for pump drive 142 and the driven sprocket for pump drive 144 to each other in a power transmittable manner. As shown in FIG. 5, the first one-way clutch 148 is disposed between the outer peripheral surface 130b of the end 130a of the oil pump drive shaft 130 and the inner peripheral surface 144a of the driven sprocket for pump drive 144. The driven sprocket for pump drive 144 is coupled to the drive sprocket for front wheel drive 44 via the pump driving chain 146 or the like, in a power transmittable manner. In addition, the first one-way clutch 148 is interposed in a power transmission path between the oil pump 120 and the drive sprocket for front wheel drive 44.

Figure 6:
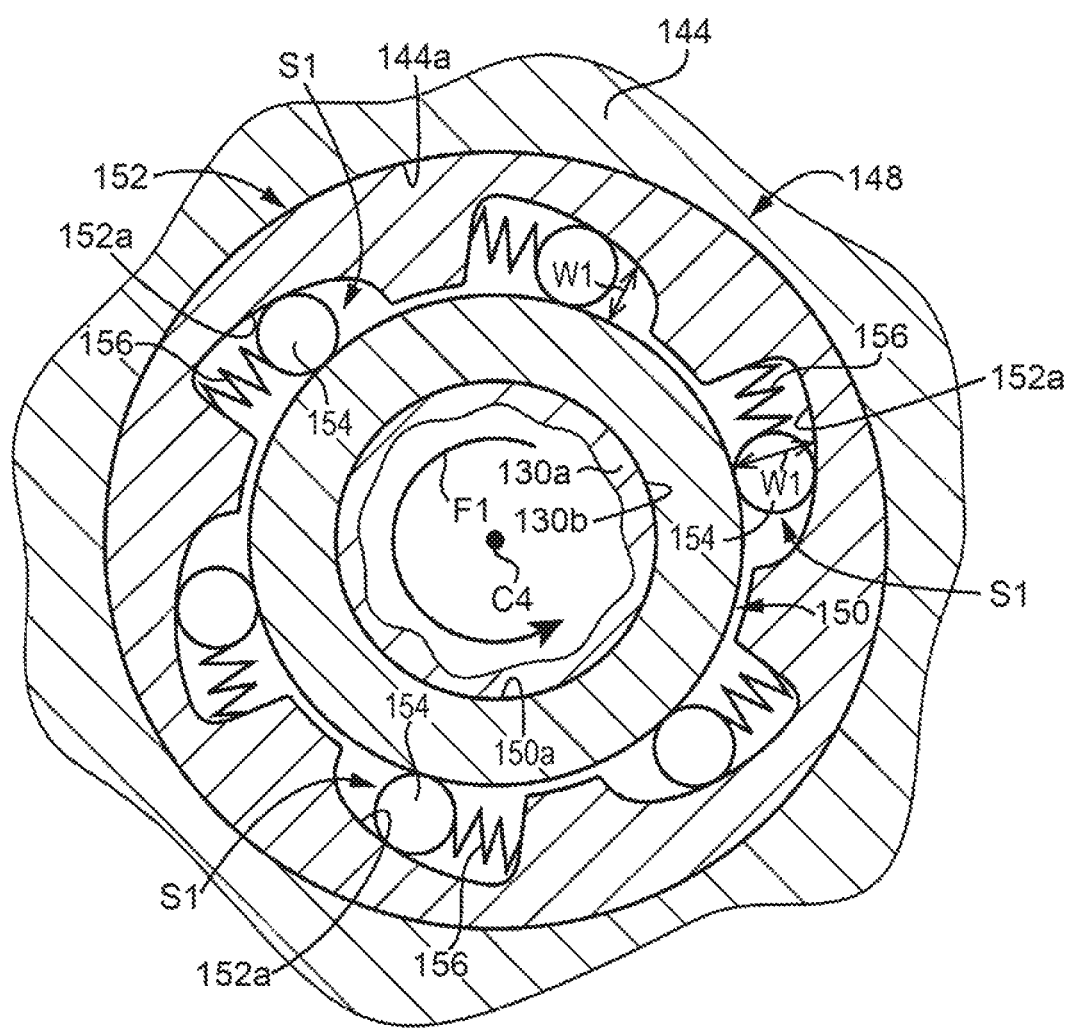
FIG. 6 is a sectional view taken along line VI-VI in FIG. 5.

For example, as shown in FIG. 6, the first one-way clutch 148 includes an annular inner ring 150, an annular outer ring 152, a plurality of cylindrical rollers 154, and a plurality of springs 156. The end 130a on the rear wheel 16L, 16R side of the oil pump drive shaft 130 is fitted into an inner peripheral surface 150a of the inner ring 150 so as not to be rotatable relative to the inner ring 150. The outer ring 152 is fitted into the inner peripheral surface 144a of the driven sprocket for pump drive 144 so as not to be rotatable relative to the driven sprocket for pump drive 144. A roller 154 is accommodated in a first accommodation space S1 formed between the inner ring 150 and the outer ring 152. A spring 156 is accommodated in the first accommodation space S1, and the spring 156 urges the roller 154 such that the roller 154 abuts to a cam surface 152a formed on the inner peripheral surface of the outer ring 152. The first accommodation space S1 is formed such that a radial width W1 of the first one-way clutch 148 gradually increases along the direction of the arrow F1, for example.

In the first one-way clutch 148 as configured above, when the driven sprocket for pump drive 144 is rotated about the fourth rotation axis C4 in the direction of the arrow F1, the contact surface pressure between the cam surface 152a of the outer ring 152 and the roller 154 becomes higher, and the rotational driving power of the driven sprocket for pump drive 144 rotating in the direction of the arrow F1 is transmitted to the inner ring 150, so that the inner ring 150, that is, the oil pump drive shaft 130 rotates about the fourth rotation axis C4 in the direction of the arrow F1. In addition, when the driven sprocket for pump drive 144 is rotated in a direction opposite to the direction of the arrow F1 about the fourth rotation axis C4, the contact surface pressure between the cam surface 152a of the outer ring 152 and the roller 154 becomes lower, and thus a rotational driving power of the driven sprocket for pump drive 144 rotating in the direction opposite to the direction of the arrow F1 is not transmitted to the inner ring 150, that is, the oil pump drive shaft 130.

In the first power transmission path 138, during the four-wheel drive of the four-wheel drive vehicle 10 in which the piston 82 presses the frictional engagement element 80 of the front-wheel drive clutch 48 or the outer peripheral teeth 70a of the lock sleeve 70 mesh with the lock teeth 68, part of the driving power from the engine 12 is transmitted to the front wheel-side output shaft 52. In the transfer 22, as shown in FIG. 4, when the four-wheel drive vehicle 10 travels forward, the input shaft 40 and the rear wheel-side output shaft 42 rotate about the first rotation axis C1 in the direction of the arrow F2 (forward direction); and when the four-wheel drive vehicle 10 travels backward, the input shaft 40 and the rear wheel-side output shaft 42 rotate in a direction opposite to the direction of the arrow F2 about the first rotation axis C1, that is, in the direction of the arrow F3 (reverse direction). Therefore, in the first power transmission path 138, when the four-wheel drive vehicle 10 travels forward during the four-wheel drive of the four-wheel drive vehicle 10, as shown in FIG. 4, the driven sprocket for pump drive 144 is configured to rotate about the fourth rotation axis C4 in the direction of the arrow F1. In the first power transmission path 138, when the four-wheel drive vehicle 10 travels backward during the four-wheel drive of the four-wheel drive vehicle 10, as shown in FIG. 4, the driven sprocket for pump drive 144 is configured to rotate in the direction opposite to the direction of the arrow F1 about the fourth rotation axis C4.

As shown in FIG. 4 and FIG. 5, the second power transmission path 140 includes a drive gear for pump drive 158, a first driven gear 160, and a second one-way clutch 162. The drive gear for pump drive 158 is formed in the carrier CA of the planetary gear device 60, and the drive gear for pump drive 158 is coupled to the input shaft 40 in a power transmittable manner, and rotates together with the carrier CA about the first rotation axis C1. The first driven gear 160 meshes with the drive gear for pump drive 158, and the first driven gear 160 is formed in an annular shape, and is disposed on the outer periphery of an end 130c of the oil pump drive shaft 130 (see FIG. 5) located on the front wheel 14L, 14R side. As shown in FIG. 5, the second one-way clutch 162 is disposed between an outer peripheral surface 130d of the end 130c of the oil pump drive shaft and an inner peripheral surface 160a of the first driven gear 160. The second one-way clutch 162 is interposed in a power transmission path between the oil pump 120 and the drive gear for pump drive 158.

Figure 7:
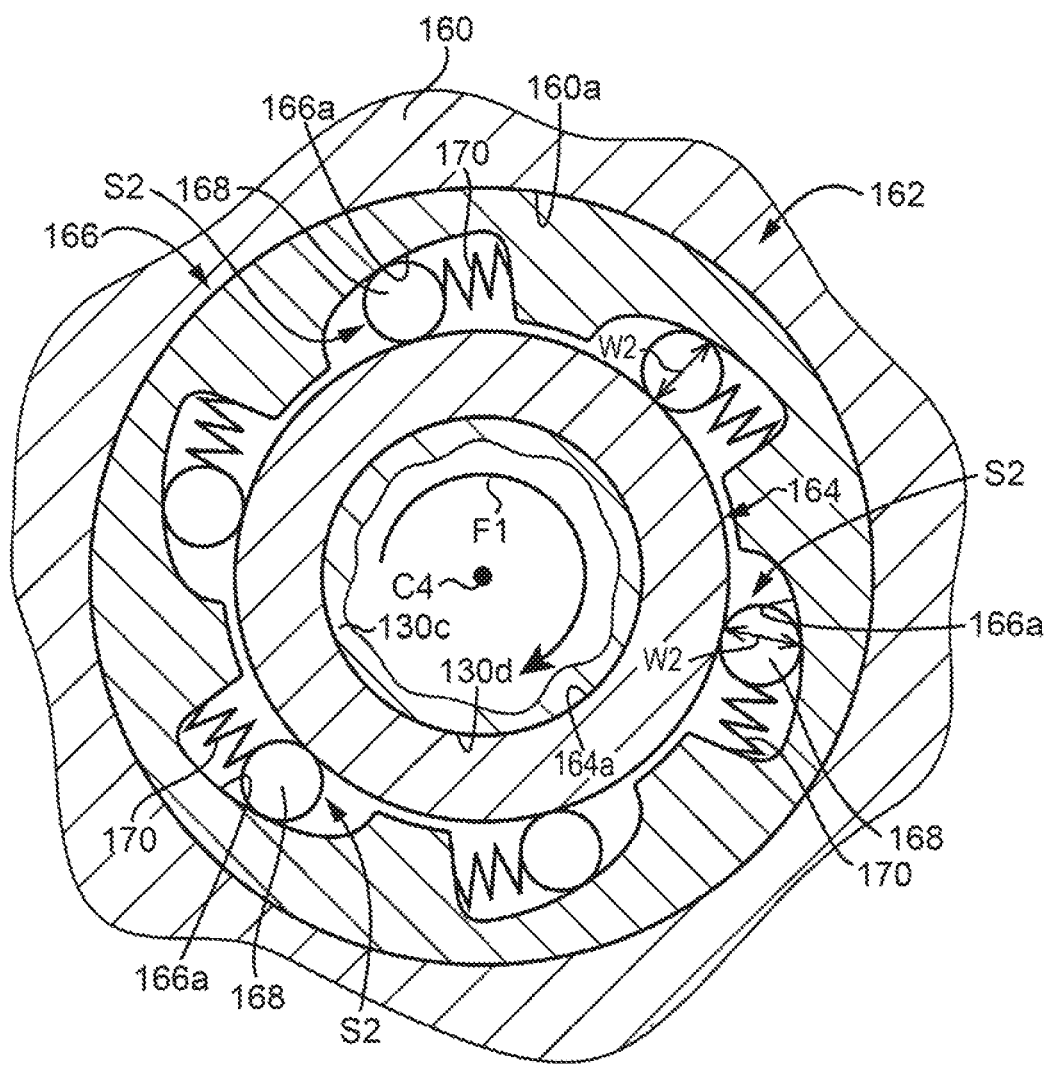
FIG. 7 is a sectional view taken along line VII-VII in FIG. 5.

For example, as shown in FIG. 7, the second one-way clutch 162 includes an annular inner ring 164, an annular outer ring 166, a plurality of cylindrical rollers 168, and a plurality of springs 170. The end 130c of the oil pump drive shaft 130 located on the front wheel 14L, 14R side is fitted into an inner peripheral surface 164a of the inner ring 164 so as not to be rotatable relative to the inner ring 164. The outer ring 166 is fitted into the inner peripheral surface 160a of the first driven gear 160 so as not to be rotatable relative to the first driven gear 160. Each of the rollers 168 is accommodated in each of second accommodation spaces S2 formed between the inner ring 164 and the outer ring 166. Each of the springs 170 is accommodated in each of the second accommodation spaces S2, and the spring 170 urges the roller 168 such that the roller 168 abuts to a cam surface 166a formed on an inner peripheral surface of the outer ring 166. Each second accommodation space S2 is formed such that a radial width dimension W2 of the second one-way clutch 162 gradually increases along the direction of the arrow F1, for example.

In the second one-way clutch 162 as configured above, when the first driven gear 160 is rotated about the fourth rotation axis C4 in the direction of the arrow F1, the contact surface pressure between the cam surface 166a of the outer ring 166 and the roller 168 becomes higher, and a rotational driving power of the first driven gear 160 rotating in the direction of the arrow F1 is transmitted to the inner ring 164, and whereby the inner ring 164, that is, the oil pump drive shaft 130 rotates about the fourth rotation axis C4 in the direction of the arrow F1. In addition, when the first driven gear 160 is rotated about the fourth rotation axis C4 in the direction opposite to the arrow F1 direction, the contact surface pressure between the cam surface 166a of the outer ring 166 and the roller 168 becomes lower; thus, the rotational driving power of the first driven gear 160 rotating in the direction opposite to the direction of the arrow F1 is not transmitted to the inner ring 164, that is, the oil pump drive shaft 130.

In the second power transmission path 140, during the two-wheel drive and the four-wheel drive of the four-wheel drive vehicle 10, the driving power from the engine 12 is transmitted to the drive gear for pump drive 158 coupled to the input shaft 40 in a power transmittable manner. Therefore, in the second power transmission path 140, when the four-wheel drive vehicle 10 travels forward regardless of by the two-wheel drive or the four-wheel drive of the four-wheel drive vehicle 10, as shown in FIG. 4, the first driven gear 160 rotates about the fourth rotation axis C4 in the direction opposite to the direction of the arrow F1. In the second power transmission path 140, when the four-wheel drive vehicle 10 travels backward regardless of by the two-wheel drive or the four-wheel drive of the four-wheel drive vehicle 10, as shown in FIG. 4, the first driven gear 160 rotates about the fourth rotation axis C4 in the arrow F1 direction.

In the four-wheel drive vehicle 10 as configured above, at the time of the forward traveling of the four-wheel drive vehicle 10 by the two-wheel drive, even if the drive gear for pump drive 158 rotates in the direction of the arrow F2 (forward direction), the second one-way clutch 162 does not transmit the rotational driving power in the direction of the arrow F2 transmitted from the drive gear for pump drive 158, to the oil pump drive shaft 130 in the second power transmission path 140. Therefore, when the four-wheel drive vehicle 10 travels forward by the two-wheel drive, the oil pump 120 stops. At the time of the two-wheel drive of the four-wheel drive vehicle 10, the front-wheel drive clutch 48 or the differential lock mechanism 58 disconnects the power transmission path between the rear wheel-side output shaft 42 and the drive sprocket for front wheel drive 44, and thus the drive sprocket for front wheel drive 44 does not rotate.

In addition, in the four-wheel drive vehicle 10, at the time of the backward traveling of the four-wheel drive vehicle 10 by the two-wheel drive, when the drive gear for pump drive 158 rotates in the direction of the arrow F3 (reverse direction), the second one-way clutch 162 transmits the rotational driving power in the direction of the arrow F3 from the drive gear for pump drive 158 to the oil pump drive shaft 130 in the second power transmission path 140, and thus the oil pump drive shaft 130 is rotated in the direction of the arrow F1 about the fourth rotation axis C4. Therefore, when the four-wheel drive vehicle 10 travels backward by the two-wheel drive, the oil pump 120 is brought to rotationally drive in conjunction with the rotation of the drive gear for pump drive 158.

In the four-wheel drive vehicle 10, at the time of the forward traveling of the four-wheel drive vehicle 10 by the four-wheel drive, when the drive sprocket for front wheel drive 44 rotates in the direction of the arrow F2 (forward direction), the first one-way clutch 148 transmits the rotational driving power in the direction of the arrow F2 from the drive sprocket for front wheel drive 44 to the oil pump drive shaft 130 in the first power transmission path 138. Therefore, the oil pump drive shaft 130 is rotated about the fourth rotation axis C4 in the direction of the arrow F1. Accordingly, when the four-wheel drive vehicle 10 travels forward by the four-wheel drive, the oil pump 120 rotationally drives in conjunction with the rotation of the drive sprocket for front wheel drive 44. At the time of the forward traveling of the four-wheel drive vehicle 10 by the four-wheel drive, even when the drive gear for pump drive 158 rotates in the direction of the arrow F2 (forward direction), the second one-way clutch 162 does not transmit the rotational driving power in the direction of the arrow F2 transmitted from the drive gear for pump drive 158, to the oil pump drive shaft 130 in the second power transmission path 140.

Further, in the four-wheel drive vehicle 10, at the time of the backward traveling of the four-wheel drive vehicle 10 by the four-wheel drive, when the drive gear for pump drive 158 rotates in the direction of the arrow F3 (reverse direction), the second one-way clutch 162 transmits the rotational driving power in the direction of the arrow F3 from the drive gear for pump drive 158 to the oil pump drive shaft 130 in the second power transmission path 140, and whereby the oil pump drive shaft 130 is rotated about the fourth rotation axis C4 in the direction of the arrow F1. Therefore, when the four-wheel drive vehicle 10 travels backward by the four-wheel drive, the oil pump 120 rotationally drives in conjunction with the rotation of the drive gear for pump drive 158. When the four-wheel drive vehicle 10 travels backward by the four-wheel drive, even when the drive sprocket for front wheel drive 44 rotates in the direction of the arrow F3 (reverse direction), the first one-way clutch 148 does not transmit the rotational driving power in the direction of the arrow F3 transmitted from the drive sprocket for front wheel drive 44, to the oil pump drive shaft 130 in the first power transmission path 138.

As described above, according to the transfer 22 of the present embodiment, the oil pump 120 is brought to rotationally drive via the first one-way clutch 148 by the rotation of the drive sprocket for front wheel drive 44; and at the time of the forward traveling of the four-wheel drive vehicle 10 by the four-wheel drive, the oil pump 120 is brought to rotationally drive in conjunction with the rotation of the drive sprocket for front wheel drive 44, and is brought to stop when the four-wheel drive vehicle 10 travels forward by the two-wheel drive. The oil pump 120 stops when the four-wheel drive vehicle 10 travels forward by the two-wheel drive while the front-wheel drive clutch 48 is released. Therefore, the oil pump 120 stops when it is unnecessary to supply the lubricating oil. Since the oil pump 120 stops when the four-wheel drive vehicle 10 travels forward by the two-wheel drive, the loss of the driving power transmitted from the engine 12 to the rear wheels 16L, 16R can be preferably reduced.

In addition, according to the transfer 22 of the present embodiment, the transfer 22 further includes the drive gear for pump drive 158 that is coupled to the input shaft 40 in a power transmittable manner and rotates about the first rotation axis C1; and in the power transmission path between the oil pump 120 and the drive gear for pump drive 158, the second one-way clutch 162 is interposed so as to transmit the rotational driving power in the reverse direction, that is, in the direction of the arrow F3 transmitted from the drive gear for pump drive 158, to the oil pump 120 when the four-wheel drive vehicle 10 travels backward, and not to transmit the rotational driving power in the forward direction, that is, in the direction of the arrow F2 transmitted from the drive gear for pump drive 158, to the oil pump 120 when the four-wheel drive vehicle 10 travels forward. Therefore, the second one-way clutch 162 transmits the rotational driving power in the direction of the arrow F3 from the drive gear for pump drive 158, to the oil pump 120 when the four-wheel drive vehicle 10 travels backward, and thus the oil pump 120 can be brought to rotationally drive at the time of the backward traveling. Accordingly, in such a scene that the four-wheel drive vehicle 10 travels backward by the four-wheel drive during traveling on off-road terrains which makes it relatively difficult for the four-wheel drive vehicle 10 to travel by the two-wheel drive, it is possible to preferably suppress seizing of the front-wheel drive clutch 48 when the four-wheel drive vehicle 10 travels backward on off-road terrains.

Moreover, according to the transfer 22 of the present embodiment, the transfer 22 is provided with the high-low switching mechanism 46 including planetary gear device 60 having: the sun gear S coupled to the input shaft 40; the carrier CA; and the ring gear R coupled to the transfer case 38, the high-low switching mechanism 46 being configured to switch the rotating element coupled to the rear wheel-side output shaft 42, between the sun gear S and the carrier CA; and the drive gear for pump drive 158 is formed on the carrier CA of the planetary gear device 60. Therefore, in the four-wheel drive vehicle 10 provided with the high-low switching mechanism 46, it is possible to preferably reduce the loss of the driving power transmitted from the engine 12 to the rear wheels 16L, 16R at the time of the forward traveling of the four-wheel drive vehicle 10 by the two-wheel drive; and it is also possible to preferably suppress seizing of the front-wheel drive clutch 48 at the time of the backward traveling of the four-wheel drive vehicle 10 on off-road terrains.

Further, according to the transfer 22 of the present embodiment, the oil pump 120 includes an oil pump drive shaft 130 that is brought to rotate about the fourth rotation axis C4 in a predetermined direction, that is, in the direction of the arrow F1 so as to supply the lubrication oil to the front-wheel drive clutch 48; the annular first driven gear 160 meshing with the drive gear for pump drive 158 is disposed on the outer periphery of the oil pump drive shaft 130; the second one-way clutch 162 is disposed between the outer peripheral surface 130d of the oil pump drive shaft 130 and the inner peripheral surface 160a of the first driven gear 160; when the drive gear for pump drive 158 rotates in the direction of the arrow F3, the second one-way clutch 162 brings the oil pump drive shaft 130 to rotate about the fourth rotation axis C4 in the direction of the arrow F1; and when the drive gear for pump drive 158 rotates in the direction of the arrow F2, the second one-way clutch 162 does not transmit the rotational driving power in the direction of the arrow F2 transmitted from the drive gear for pump drive 158, to the oil pump drive shaft 130. Therefore, even when the drive gear for pump drive 158 rotates in the direction of the arrow F2, the oil pump drive shaft 130 is prevented from reversely rotating in the direction opposite to the direction of the arrow F1 in conjunction with the rotation of the drive gear for pump drive 158.

Moreover, according to the transfer 22 of the present embodiment, the annular driven sprocket for pump drive 144, which is coupled to the drive sprocket for front wheel drive 44 in a power transmittable manner, is provided on the outer periphery of the oil pump drive shaft 130; the first one-way clutch 148 is disposed between the outer peripheral surface 130b of the oil pump drive shaft 130 and the inner peripheral surface 144a of the driven sprocket for pump drive 144; when the drive sprocket for front wheel drive 44 rotates in the direction of the arrow F2, the first one-way clutch 148 brings the oil pump drive shaft 130 to rotate about the fourth rotation axis C4 in the direction of the arrow F1; and when the drive sprocket for front wheel drive 44 rotates in the direction of the arrow F3, the first one-way clutch 148 does not transmit the rotational driving power in the direction of the arrow F3 transmitted from the drive sprocket for front wheel drive 44, to the oil pump drive shaft 130. Accordingly, even when the drive sprocket for front wheel drive 44 rotates in the direction of the arrow F3, the oil pump drive shaft 130 is prevented from reversely rotating in the direction opposite to the direction of the arrow F1 in conjunction with the rotation of the drive sprocket for front wheel drive 44.

Subsequently, another embodiment of the present disclosure will be described in detail based on the drawings. In the following description, components common to those of the embodiments will be denoted by the same reference numerals, and the description thereof will be omitted.

Figure 8:
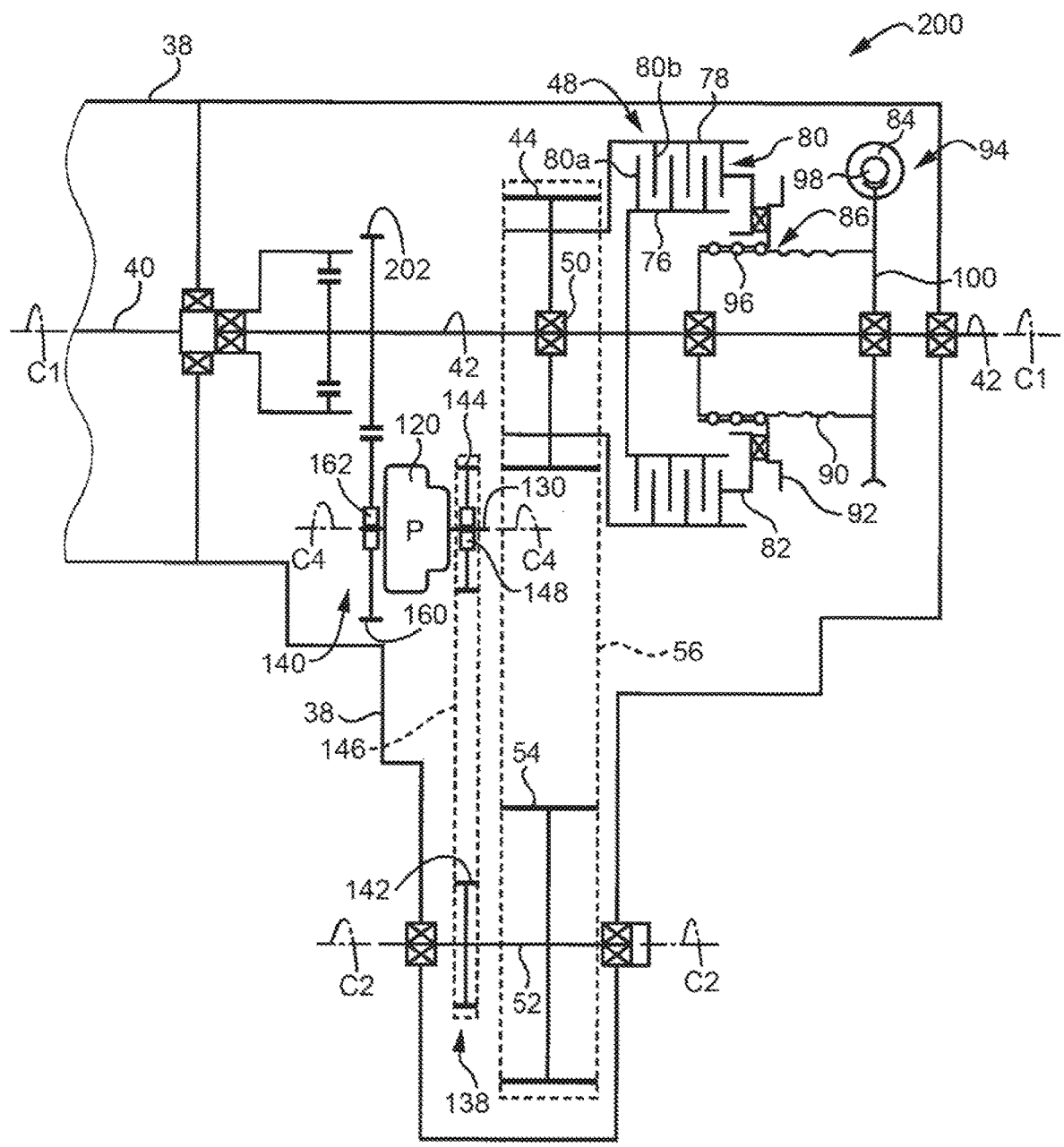
FIG. 8 is a view explaining a transfer of another embodiment (a second embodiment) of the present disclosure.

FIG. 8 is a view explaining a transfer (transfer for a four-wheel drive vehicle) 200 according to another embodiment of the present disclosure. As compared with the transfer 22 of the first embodiment, the transfer 200 of the present embodiment is different from the transfer 22 in that the high-low switching mechanism 46 and the differential lock mechanism 58 are removed, and in that a drive gear for pump drive 202 meshing with the first driven gear 160 is integrally provided to the rear wheel-side output shaft 42; and the other configurations of the transfer 200 are substantially the same as those of the transfer 22 of the first embodiment. The drive gear for pump drive 202 is coupled to the input shaft 40 in a power transmittable manner, and is supported by the rear wheel-side output shaft 42 about the first rotation axis C1. In the transfer 200 of the present embodiment, it is possible to attain substantially the same effect as that of the transfer 22 of the first embodiment. That is, in the transfer 200 of the present embodiment, since the oil pump 120 stops during the forward traveling of the four-wheel drive vehicle 10 by the two-wheel drive, it is possible to preferably reduce the loss of the driving power transmitted from the engine 12 to the rear wheels 16L, 16R during the forward traveling by the two-wheel drive. In addition, in the transfer 200 of the present embodiment, since the oil pump 120 can be brought to rotationally drive when the four-wheel drive vehicle 10 travels backward, at the time of the backward traveling of the four-wheel drive vehicle 10 on off-road terrains, the seizing of the front-wheel drive clutch 48 can be preferably suppressed.

The embodiments of the present disclosure have been described in detail with reference to the drawings, but the present disclosure is also applicable in other aspects.

For example, in the above-described first embodiment, the drive gear for pump drive 158 is provided on the carrier CA of the planetary gear device 60, and in the above-described second embodiment, the drive gear for pump drive 202 is provided on the rear wheel-side output shaft 42. For example, each of the drive gear for pump drive 158, 202 may be provided at any position as far as this drive gear for pump drive is coupled to the input shaft 40 in a power transmittable manner, and the rotation of this drive gear for pump drive 158, 202 can be transmitted to the oil pump 120.

In the above-described first and second embodiments, the front-wheel drive clutch 48 is a multi-plate wet clutch, but may be a single-plate wet clutch, for example. In the above-described embodiments, the oil pump 120 is an inner gear oil pump, but may be an outer gear oil pump, a vane oil pump, or the like. That is, any type of oil pump may be used as far as this oil pump supplies the lubricating oil to the front-wheel drive clutch 48 as the oil pump drive shaft 130 is brought to rotate in a predetermined direction.

Note that the above description is merely one embodiment, and the applicable embodiment can be implemented in variously modified and improved forms based on the knowledge of those skilled in the art.

What is claimed is:

1. A transfer for a four-wheel drive vehicle, the four-wheel drive vehicle including a driving power source, main drive wheels and auxiliary drive wheels, and a propeller shaft that transmits part of driving power from the driving power source to the auxiliary drive wheels when the four-wheel drive vehicle travels by four-wheel drive, the four-wheel drive vehicle configured to disconnect the propeller shaft from a power transmission path between the auxiliary drive wheels and the driving power source when the four-wheel drive vehicle travels by two-wheel drive, the transfer comprising:
an input rotating member configured to be coupled to the driving power source so as to transmit power from the driving power source and to rotate about a first rotation axis;
a first output rotating member configured to output the driving power transmitted to the input rotating member from the driving power source, to the main drive wheels;
a second output rotating member configured to output the driving power to the propeller shaft;
a single-plate or multi-plate wet clutch configured to transmit part of the driving power transmitted to the first output rotating member, to the second output rotating member;
an oil pump configured to rotationally drive in conjunction with rotation of the second output rotating member via a first one-way clutch, the first one-way clutch being configured such that the oil pump supplies a lubrication oil to the wet clutch when the four-wheel drive vehicle travels forward by the four-wheel drive, and the oil pump being configured to stop supplying the lubrication oil to the wet clutch when the four-wheel drive vehicle travels forward by the two-wheel drive;
a drive gear for pump drive coupled to the input rotating member in a power transmittable manner, and rotating about the first rotation axis; and a second one-way clutch located in a power transmission path between the oil pump and the drive gear for pump drive, wherein the second one-way clutch is configured to transmit a rotational driving power from the drive gear for pump drive in a reverse direction, to the oil pump when the four-wheel drive vehicle travels backward, and configured not to transmit a rotational driving power in a forward direction from the drive gear for pump drive, to the oil pump when the four-wheel drive vehicle travels forward.

2. The transfer according to claim 1, further comprising:

a planetary gear device including a first rotating element coupled to the input rotating member, a second rotating element, and a third rotating element coupled to a non-rotating member; and a high-low switching mechanism configured to switch a rotating element coupled to the first output rotating member, between the first rotating element and the second rotating element, wherein the drive gear for pump drive is configured to rotate about the first rotation axis together with the second rotating element of the planetary gear device.

3. The transfer according to claim 1, further comprising:

a first driven gear wherein:

the oil pump includes an oil pump drive shaft rotating about a second rotation axis in a predetermined direction so as to supply the lubrication oil to the wet clutch;

the first driven gear has an annular shape, and meshes with the drive gear for pump drive on an outer periphery of the oil pump drive shaft;

the second one-way clutch is located between an outer peripheral surface of the oil pump drive shaft and an inner peripheral surface of the first driven gear;

the second one-way clutch is configured such that the oil pump drive shaft rotates about the second rotation axis in the predetermined direction when the drive gear for pump drive rotates in the reverse direction; and the second one-way clutch is configured not to transmit the rotational driving power in the forward direction from the drive gear for pump drive, to the oil pump drive shaft when the drive gear for pump drive rotates in the forward direction.

4. The transfer according to claim 3, further comprising:

an annular transmission member; and a second driven gear coupled to the outer periphery of the oil pump drive shaft via the annular transmission member such that the power is transmitted between the second output rotating member and the second driven gear, wherein:

the first one-way clutch is located between the outer peripheral surface of the oil pump drive shaft and an inner peripheral surface of the second driven gear;

the first one-way clutch is configured such that the oil pump drive shaft rotates about the second rotation axis in the predetermined direction when the second output rotating member rotates in the forward direction; and the first one-way clutch is configured such that a rotational driving power in the reverse direction from the second output rotating member is not transmitted to the oil pump drive shaft when the second output rotating member rotates in the reverse direction.

* * * * *